(12) United States Patent
Bondavalli (10) Patent No.: US 10,748,717 B2
(45) Date of Patent: Aug. 18, 2020

(54) METHOD FOR PRODUCING A SUPERCAPACITOR

(71) Applicant: THALES, Courbevoie (FR)

(72) Inventor: Palolo Bondavalli, Palaiseau (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 16/300,521

(22) PCT Filed: May 15, 2017

(86) PCT No.: PCT/EP2017/061597
§ 371 (c)(1),
(2) Date: Nov. 9, 2018

(87) PCT Pub. No.: WO2017/198608
PCT Pub. Date: Nov. 23, 2017

(65) Prior Publication Data
US 2019/0228921 A1    Jul. 25, 2019

(30) Foreign Application Priority Data

May 20, 2016 (FR) ...................................... 16 00808

(51) Int. Cl.
*H01G 11/86* (2013.01)
*H01G 11/36* (2013.01)
(Continued)

(52) U.S. Cl.
CPC ............ *H01G 11/86* (2013.01); *H01G 11/36* (2013.01); *H01G 11/42* (2013.01); *H01G 13/00* (2013.01); *Y02E 60/13* (2013.01)

(58) Field of Classification Search
None
See application file for complete search history.

(56) References Cited

U.S. PATENT DOCUMENTS

| 2011/0045253 A1* | 2/2011 | Nielsen | H01G 9/06 428/195.1 |
| 2013/0189577 A1* | 7/2013 | Wang | H01M 4/131 429/211 |

FOREIGN PATENT DOCUMENTS

| FR | 2 976 118 A1 | 12/2012 |
| WO | 2009/035488 A2 | 3/2009 |

(Continued)

OTHER PUBLICATIONS

Bondavalli et al., "Supercapacitor electrode based on mixtures of graphite and carbon nanotubes deposited using a dynamic air-brush deposition technique.", Journal of The Electrochemical Society, 160(4), A601-A606, 2013.

*Primary Examiner* — Asok K Sarkar
(74) *Attorney, Agent, or Firm* — Baker & Hostetler LLP (57) ABSTRACT

Components for energy storage, in particular to a process for producing a supercapacitor includes a flexible substrate, the process comprising at least the steps of unwinding the flexible substrate from a first roll, spraying a plurality of suspensions comprising micro/nanoparticles suspended in a solvent, the suspension(s) being sprayed by a plurality of nozzles, transporting at least a portion of the flexible substrate at least through a region for deposition of micro/nanoparticles, along a direction of transport of the flexible substrate, the interaction of the deposition region and of the flexible substrate forming an impact region, heating the flexible substrate, during each spraying operation, so as to encourage the complete evaporation of the solvent(s) from the suspensions sprayed onto the flexible substrate.

16 Claims, 3 Drawing Sheets

(51) Int. Cl.
*H01G 13/00* (2013.01)
*H01G 11/42* (2013.01)

(56) References Cited

FOREIGN PATENT DOCUMENTS

| | | |
|---|---|---|
| WO | 2012/049428 A2 | 4/2012 |
| WO | 2013/096220 A1 | 6/2013 |
| WO | 2014/147419 A1 | 9/2014 |
| WO | 2014/149898 A1 | 9/2014 |

* cited by examiner

METHOD FOR PRODUCING A SUPERCAPACITOR

CROSS-REFERENCE TO RELATED APPLICATIONS

This application is a National Stage of International patent application PCT/EP2017/061597, filed on May 15, 2017, which claims priority to foreign French patent application No. FR 1600808, filed on May 20, 2016, the disclosures of which are incorporated by reference in their entirety.

FIELD OF THE INVENTION

The invention relates to components for energy storage, in particular to a process for producing capacitors. The capacitors in question are also referred to as "supercapcacitors" and are characterized by a greater energy density than that of dielectric capacitors and a higher power density than that of batteries.

BACKGROUND

Supercapacitors generally comprise two porous electrodes impregnated with an electrolyte (an ionic salt in generally organic solution, a quaternary ammonium salt, such as tetraethylammonium tetrafluoroborate in acetonitrile or propylene carbonate, for example). These electrodes are generally separated by an insulating and porous membrane allowing the circulation of the ions of the electrolyte.

The first supercapacitors, known as "EDLCs" (Electrochemical Double Layer Capacitators), are based on a principle equivalent to that of conventional capacitors with polarizable electrodes and an electrolyte acting as dielectric. Their capacity originates from the arrangement of a double layer of ions and of electrons at the electrolyte/electrode interface. Today, supercapacitors combine, for energy storage, a capacitive component resulting from the electrostatic arrangement of the ions close to the electrodes and a pseudocapacitive component due to oxidation/reduction reactions in the capacitor.

The electrostatic component of the energy storage is produced by a nonhomogeneous distribution of the ions of the electrolyte in the vicinity of the surface of each electrode, under the effect of the difference in potential applied between the two electrodes. The electrostatic component of the energy storage confers a potentially high specific power and a very good behavior throughout the charging and discharging cycles.

Materials having a very high ratio of specific surface to volume, having a porosity suited to ion storage at this scale, have been developed in order to increase the capacity of supercapacitors. The methods for manufacturing these materials have been directed towards the use of fullerenes, carbon nanotubes, activated carbon, carbon nanofibers or CNFs and graphene, which are advantageously light, inexpensive and less toxic than the materials commonly used for producing batteries.

Supercapacitors might replace conventional capacitors for applications having a high energy demand, especially having extreme temperatures, vibrations, high accelerations or a high salinity. In these environments, batteries may not operate without their lifetime being greatly restricted (these conditions apply to radars, to motor sports, to electrical avionics and to military applications, for example).

Supercapacitors are mainly applied to systems which require energy peaks over short times (i.e. with high power), of the order of a minute, for phases of acceleration of vehicles in ground transportation (motor vehicles, tramways, buses, "stop and start" devices, in which energy is recovered during the deceleration).

Supercapacitors might also be useful for the management of electricity in onboard systems, for rendering electrical installations secure, for rendering the energy supply of sensitive systems (radio sets, monitoring systems, military field, data centre) secure, in networks of self-contained sensors for applications in monitoring industrial, complex or sensitive sites (hospitals, avionics, offshore platform, oil prospecting, underwater applications) and finally in renewable energies (wind power, recovery of atmospheric electrical energy).

In order to enable an industrial application, the energy density and the power of supercapacitors have to be optimized. Furthermore, the internal resistance of a supercapacitor is currently too high and poorly controlled. The usual supercapacitors are composed of activated carbons with nonhomogeneous and nonoptimized distributions of the size of the pores and use a polymeric binder to ensure the mechanical strength of their structure. This binder increases the internal electrical resistance of the capacitor and disadvantageously increases its weight. Furthermore, this binder breaks down over time and pollutes the electrolyte by degrading the performance of the supercapacitor. The unsuitable porosity also produces a resistance to ion transfer within the active material.

The publication by Bondavalli, P., Delfaure, C., Legagneux, P., Pribat, D., 2013, *"Supercapacitor electrode based on mixtures of graphite and carbon nanotubes deposited using a dynamic air-brush deposition technique."*, Journal of The Electrochemical Society, 160(4), A601-A606, discloses a process for the deposition of graphene nano/microparticles and of carbon nanotubes by hydrodynamic spraying of a suspension over a support. This process makes it possible to produce supercapacitors achieving high energy and power densities, without use of a polymeric binder, but requires the use of toxic and polluting solvents, such as N-methyl-2-pyrrolidone (NMP) in order to enable the suspension of the nano/microparticles. The solvents used are however suitable for suspending this type of micro/nanoparticles.

The publication by Bondavalli et al. also discloses the production of collectors on surfaces of the order of a $cm^2$. The spraying operation is carried out using a nozzle that sprays a suspension composed of several types of mixed micro/nanoparticles. In order to cover this surface, the substrate is fixed and the spraying jet of a nozzle may be displaced in a plane so as to cover a surface by adjusting the trajectory of the jet so as to have as uniform a deposition as possible of micro/nanoparticles.

The evaporation of toxic solvents such as NMP may be confined to the laboratory during production of small surface areas, for example by carrying out the deposition under a hood. Treatment of the toxic emissions poses a technical challenge if the rate of production of the collectors, electrodes or capacitors is scaled up to the industrial level.

Producing a supercapacitor may require the deposition of several layers of different compositions of micro/nanoparticles. Using the technique disclosed in Bondavalli et al., the nozzle must be changed or cleaned during each of the steps of deposition of different micro/nanoparticles or of layers having different compositions of micro/nanoparticles.

The nozzles are also subject to clogging. The concentrations of micro/nanoparticles may be high during a spraying operation carried out under the conditions described by Bondavalli et al.: clogging poses a maintenance challenge during industrial use of this method for the production of collectors, electrodes or supercapacitors.

SUMMARY OF THE INVENTION

The invention aims to overcome the abovementioned drawbacks of the prior art, and more particularly to produce collectors, electrodes and/or supercapacitors at an industrial rate using the results from Bondavalli et al. obtained by spraying suspensions without requiring the evaporation of industrial amounts of toxic solvents.

One object of the invention allowing this goal to be achieved is a process for producing a supercapacitor comprising a flexible substrate, said process comprising at least the steps of:

unwinding said flexible substrate from a first roll;

spraying a plurality of suspensions comprising micro/nanoparticles suspended in a solvent, said suspensions being sprayed by a plurality of nozzles forming jets of droplets of said suspension defining a spatial region, referred to as deposition region;

transporting at least a portion of said flexible substrate through a region for deposition of micro/nanoparticles, along a direction of transport of said flexible substrate, the interaction of said deposition region and of said flexible substrate forming an impact region;

heating said flexible substrate, during each spraying operation, so as to encourage the complete evaporation of said solvent from said suspensions sprayed onto said flexible substrate;

said process being characterized in that the composition of said micro/nanoparticles of one said sprayed suspension is different from the composition of said micro/nanoparticles of at least one other said sprayed suspension, and in that an assembly of at least two nozzles simultaneously sprays at least two suspensions substantially over the same impact region.

Advantageously, the process comprises an additional step of winding said flexible substrate around a second roll.

Advantageously, the process comprises at least one step of exchanging the position of each of said nozzles from a first group of said nozzles with the position of each of said nozzles from a second group of said nozzles.

Advantageously, said flexible substrate is locally planar in said impact region along a main plane, and at least three of said nozzles are arranged in a plane that is parallel to, and different from, said main plane.

Advantageously, the assembly of said nozzles are arranged according to a matrix comprising rows and columns, said impact region of one said row being substantially transverse to the direction of transport of said flexible substrate.

Advantageously, at least one said row sprays said suspensions with the same composition of said micro/nanoparticles and with a composition that is different from at least one other said row.

Advantageously, the composition of said micro/nanoparticles of said suspensions is periodical as a function of said rows.

Advantageously, said flexible substrate is planar along a main plane and said nozzles are arranged around at least one carousel, one axis of revolution being common to each of said carousels, said axis of revolution being substantially parallel to said main plane and substantially normal to said direction of transport of said flexible substrate, said process comprising at least one step of pivoting at least one said carousel about said axis of revolution.

Advantageously, two said nozzles of said assembly spray said suspensions of micro/nanoparticles with the same composition of micro/nanoparticles and of solvent at a different angle, substantially covering the same said impact region substantially homogeneously.

Advantageously, the process comprises an additional step wherein said flexible substrate is heated during each spraying operation, so as to encourage the complete evaporation of said solvent(s) from said suspensions sprayed onto said flexible substrate, to a temperature less than or equal to one and a half times the boiling point of each said solvent and less than or equal to 200 degrees Celsius.

Advantageously, said micro/nanoparticles comprise graphene sheets.

Advantageously, at least a portion of the micro/nanoparticles is oxidized before they are suspended in a said solvent.

Advantageously, before a spraying operation, said micro/nanoparticles are suspended in a said solvent composed of more than 95% water ($H_2O$) by weight, and preferentially more than 99% water by weight.

Advantageously, said micro/nanoparticles are selected from carbon nanotubes, carbon nanofibers, carbon nanorods, carbon nanohorns, carbon onions and a mixture of these micro/nanoparticles, wherein said micro/nanoparticles are oxidized before they are sprayed, and wherein said deposit is annealed after said spraying operation at a sufficient temperature to deoxidize said micro/nanoparticles.

Advantageously, the thickness of said micro/nanoparticles deposited is measured during or after the deposition of said micro/nanoparticles.

Another subject of the invention is an electrode comprising a said flexible substrate, said flexible substrate being covered with a deposit of micro/nanoparticles, said deposition of said micro/nanoparticles being able to be obtained by a process as claimed in one of the preceding claims.

Another subject of the invention is a supercapacitor comprising at least one said electrode.

The following description gives several exemplary embodiments of the device of the invention: these examples do not limit the scope of the invention. These exemplary embodiments have both features that are essential to the invention and additional features that are linked to the embodiments under consideration. For the sake of clarity, the same elements will bear the same references in the various figures.

"Region 5 for deposition" of micro/nanoparticles 4 is intended to mean a space formed by all the droplets which are in turn formed by spraying of a suspension 7 by a nozzle 9.

"Impact region" 17 is intended to mean a surface of the flexible substrate 1 that intersects with the deposition region 5: the drops or droplets formed by spraying of a suspension 7 by a nozzle 9 are transported into the deposition region 5 until they come into contact with the flexible substrate 1 over the impact region 17.

"Flexible" is intended to mean a characteristic of a material, the mechanical properties of which allow it to be wound up.

"Nanoparticle" is intended to mean particles, at least the smallest dimension of which is nanometric, that is to say between 0.1 nm and 100 nm. "Microparticle" is intended to mean particles, at least the smallest dimension of which is micrometric, that is to say between 0.1 µm and 100 µm.

The nano/microparticle geometries comprise nano/microfibers, nano/microrods, nano/microtubes, nano/microhorns, nano/micro-onions and nano/microsheets of the monolamellar type comprising a crystalline layer or multilamellar type comprising several stacked lamellae. A nano/microtube is formed of one or more wound nano/microsheets. A nano/microfiber is a solid one-dimensional object of a bulk material. A nano/microrod is a hollow one-dimensional object.

In the case of carbon, a lamella is denoted by the term "graphene" and exists in the form of a two-dimensional carbon crystal of monoatomic thickness and of nano/micrometric size. Carbon nanotubes are known and formed of a graphene lamella wound into a tube (denoted by the acronym SWCNT (Single Wall Carbon NanoTube)) or of several stacked graphene lamellae wound into a tube (denoted by the acronym MWCNT (Multi Wall Carbon NanoTube)).

"Electrode" is intended to mean an assembly comprising a deposit of nano/microparticles on a substrate (comprising a current collector which electrically conducts and optionally a thick material or layer for the mechanical strength of the electrode).

"Microdrops" is intended to mean drops of microscopic size, the diameter of which is between approximately 1 and 100 micrometers.

BRIEF DESCRIPTION OF THE DRAWINGS

The invention will be better understood and other advantages, details and features thereof will emerge over the course of the following explanatory description, given by way of example with reference to the appended drawings, in which.

DETAILED DESCRIPTION

Figure 1:
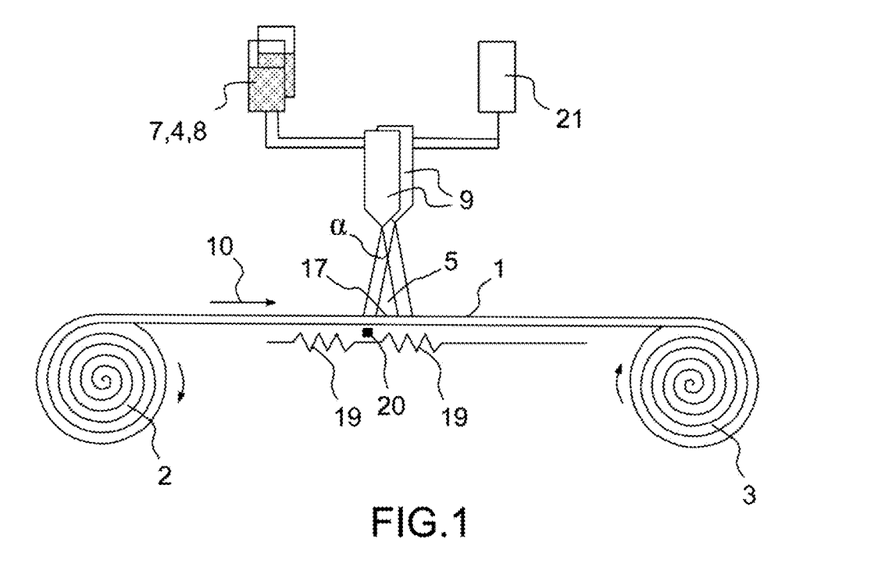
FIG. 1 is a schematic depiction of a system suitable for producing a supercapacitor according to a process in accordance with the invention.

The flexible substrate 1 is wound around a first roll 2 before any production step. It is unwound during the production of a supercapacitor. Thus, elements or portions of flexible substrate 1 are transported at least from said first roll 2 to a deposition region 5. In some embodiments of the invention, this transport may be indirect: the first roll 2 may be unwound, with portions of flexible substrate 1 passing successively over the surface of other rolls or cylinders, before arriving in a deposition region 5.

The transport through the region 5 for deposition of micro/nanoparticles 4 is carried out along a direction of transport 10 of the flexible substrate 1 in the impact region 17.

Advantageously, in one embodiment of the invention the apparatus comprises a second roll 3. This second roll 3 makes it possible to wind up the flexible substrate 1 after deposition of micro/nanoparticles 4. In some variants, the flexible substrate 1 may pass via other rolls or cylinders before being wound around the second roll 3.

The apparatus comprises a plurality of nozzles 9, a tank containing a suspension 7 of nano/microparticles 4 suspended in a solvent 8, and a gas source 21. In some embodiments of the invention, the nano/microparticles 4 may be graphene particles, carbon nanotubes, carbon nanofibers, carbon nanorods, carbon nanohorns, carbon onions, oxidized graphene particles, oxidized carbon nanotubes, oxidized carbon nanofibers, oxidized carbon nanorods, oxidized carbon nanohorns and oxidized carbon onions. Other micro/nanoparticles 4 may be envisaged.

Advantageously, at least one said micro/nanoparticle is oxidized before being suspended in a solvent 8. The oxidation may be carried out by the wet route, with at least one element selected from sulfuric acid, phosphoric acid, sodium nitrate, nitric acid, potassium permanganate and hydrogen peroxide. The oxidized carbon-based nano/microparticles are, for example, SWCNTs. In order to obtain them from SWCNTs, SWCNTs are dispersed in a mixture of equal volumes of sulfuric acid and nitric acid for 30 minutes. The mixture is subsequently refluxed for 3 hours. They can be recovered by filtering the mixture under vacuum and by washing them with several hundred milliliters of water until a neutral pH of the filtrate is obtained. The product is dried under vacuum at 70° C. for several days. The graphene oxide particles can be obtained commercially.

The solvent 8 used for the suspension may be selected from water ($H_2O$), methanol ($CH_4O$), ethanol ($C_2H_6O$), ethylene chloride (DCE), dichlorobenzidine (DCB), N-methyl-2-pyrrolidone (NMP), dimethylformamide (DMF), hexamethylphosphoramide (HMPA), cyclopentanone ($C_5H_8O$), tetramethylene sulfoxide (TMSO), ε-caprolactone, 1,2-dichlorobenzene, 1,2-dimethylbenzene, bromobenzene, iodobenzene and toluene. In some embodiments of the invention, use is made of one or more solvents 8 selected from methanol ($CH_4O$), ethanol ($C_2H_6O$), ethylene chloride (DCE), dichlorobenzidine (DCB), N-methyl-2-pyrrolidone (NMP), dimethylformamide (DMF), hexamethylphosphoramide (HMPA), cyclopentanone ($C_5H_8O$), tetramethylene sulfoxide (TMSO), ε-caprolactone, 1,2-dichlorobenzene, 1,2-dimethylbenzene, bromobenzene, iodobenzene and toluene. Other compounds may be envisaged.

The solvent 8 used for the suspension may advantageously be composed of more than 95% water ($H_2O$) and even more advantageously composed of more than 99% water ($H_2O$). In some embodiments of the invention, the water may be mixed with other solvents in proportions enabling them to remain water-miscible, such as methanol ($CH_4O$), ethanol ($C_2H_6O$), ethylene chloride (DCE), dichlorobenzidine (DCB), N-methyl-2-pyrrolidone (NMP), dimethylformamide (DMF), hexamethylphosphoramide (HMPA), cyclopentanone ($C_5H_8O$), tetramethylene sulfoxide (TMSO), ε-caprolactone, 1,2-dichlorobenzene, 1,2-dimethylbenzene, bromobenzene, iodobenzene and toluene. In some embodiments of the invention, use is made of one or more solvents 8 selected from methanol ($CH_4O$), ethanol ($C_2H_6O$), ethylene chloride (DCE), dichlorobenzidine (DCB), N-methyl-2-pyrrolidone (NMP), dimethylformamide (DMF), hexamethylphosphoramide (HMPA), cyclopentanone ($C_5H_8O$), tetramethylene sulfoxide (TMSO), ε-caprolactone, 1,2-dichlorobenzene, 1,2-dimethylbenzene, bromobenzene, iodobenzene and toluene. Other compounds may be envisaged. The use of water as solvent allows the technical problem of the use of toxic solvents on an industrial scale to be solved. It is advantageously combined with the use of micro/nanoparticles 4 that are oxidized during the suspension, since non-oxidized carbon-based micro/nanoparticles 4 have a very poor ability to be suspended in an aqueous solvent.

The spraying gas is for example air. In other embodiments, the gas is an inert gas, for example argon.

Each nozzle 9 is supplied with suspension by one or more tanks, each tank comprising a suspension 7, and supplied with spraying gas from the gas source 21. The nozzle 9 is suitable for spraying the suspension 7, supplied at low pressure, in microdrops using the gas supplied at high pressure. The nozzle 9 is of the airbrush type. The drops or microdrops are created by hydrodynamic instability between the liquid phase, the gas phase and the nozzle 9: they may be sprayed by the effect of the pressure imposed on the water, on the air and on the geometry of the nozzle 9.

In a particular embodiment of the invention, the system comprises at least one means 19 for heating the flexible substrate 1. This heating means 19 may be made of one or more resistive elements connected to an electrical supply circuit (not shown) so that the resistive element(s) emit heat by the Joule effect when an electric current passes through them. As a variant or in combination, the apparatus comprises means 19 for heating by induction, for example comprising a plate close to the flexible substrate 1, comprising inducers that are able to induce electric currents in the plate and to generate heat. As a variant or in combination, the apparatus comprises means 19 for heating by infrared radiation in the direction of the substrate.

The apparatus comprises a temperature measurement means 20 arranged so as to measure the temperature of the flexible substrate 1.

In operation, the nozzle 9 generates a spray jet formed of microdrops of suspension 7 projected in the direction of the surface to be covered of the flexible substrate 1. The spray jet forms a deposition region 5 and reaches the surface of the flexible substrate 1 to be covered in an impact region 17, the shape and the dimensions of which depend in particular on the geometry of the nozzle 9, on the adjustment of the nozzle 9 and on the position of the nozzle 9 with respect to the flexible substrate 1 to be covered.

The shape and the dimensions of the impact region 17 depend especially on the angle α at the top of the cone formed by the spray jet at the outlet of the nozzle 9 and on the distance between the outlet of the nozzle 9 and the surface of the flexible substrate 1. They also depend on the pressure of the spray gas (related to the spray gas flow rate) imposed by the gas source 21 and the flow rate of each suspension 7.

The spray jet is, for example, a cone of revolution, such that it forms an impact region 17 of circular general shape. As a variant, the spray jet might define an oblong impact region 17, which is more elongated in a first direction than in a second direction perpendicular to the first. This variant corresponds to a variable value a in the spray jet.

Several nozzles 9 enable the deposition of several suspensions 7 of micro/nanoparticles 4. FIG. 1 depicts an embodiment of the invention, wherein two nozzles 9 are arranged side by side along a direction perpendicular to the section of the apparatus illustrated in FIG. 1, and schematically depicted offset in order to aid comprehension of FIG. 1. In some embodiments of the invention, at least two suspensions 7 are each connected to different nozzles 9. In some variants, one suspension 7 may supply several nozzles 9, one nozzle 9 may be supplied by several suspensions 7 and several nozzles 9 may be supplied by several suspensions 7.

Figure 2:
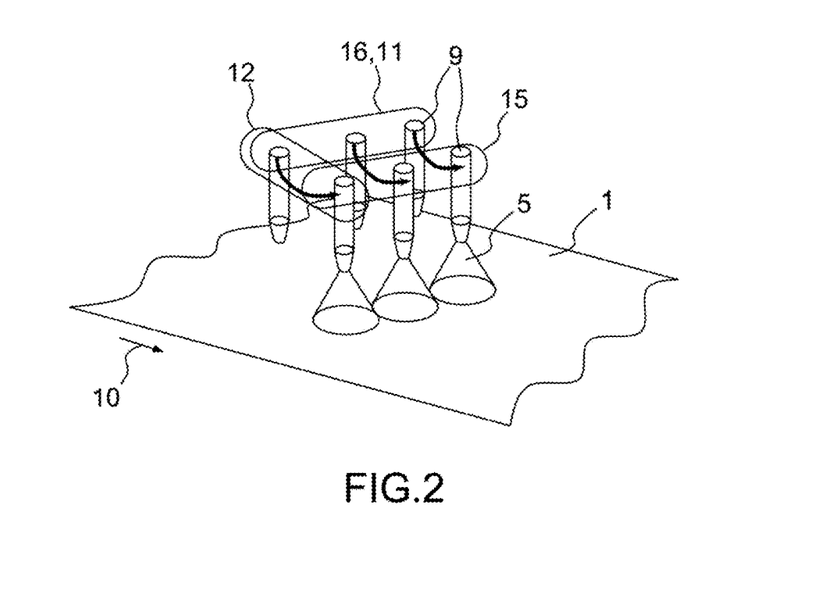
FIG. 2 is a schematic depiction of an arrangement of nozzles used for implementing a process according to the invention.

FIG. 2 is a schematic depiction of an arrangement of nozzles 9 used for implementing a process according to the invention. In one embodiment of the invention, the process for producing the supercapacitor comprises a step of exchanging the position of at least one nozzle 9 with another nozzle 9. In a variant, this step consists in exchanging the position of each of the nozzles 9 from a first group 15 of nozzles 9 with the position of each of the nozzles 9 from a second group 16 of nozzles 9. In one embodiment, illustrated in FIG. 2, a first group 15 and a second group 16 each comprise three nozzles 9. After a deposition of micro/nanoparticles 4 by spraying, carried out by the first group 15, the nozzles 9 of the first group 15 are displaced and/then the nozzles of the second group 16 take their positions. The displacement of the nozzles 9 of the second group 16 is illustrated by three black curved arrows. The displacement of the nozzles 9 of the second group 16 may be concomitant or subsequent to the displacement of the nozzles 9 of the first group 15.

This feature of the invention allows layers to be produced by successive deposition of different sprayed suspensions 7. The suspensions connected to the first group 15 and to the second group 16 may comprise different micro/nanoparticles 4 and/or different compositions of micro/nanoparticles 4.

In one embodiment wherein the position of nozzles 9 is exchanged, different transport speeds may be imposed on the flexible substrate 1, for example by a means for driving a roll. The flexible substrate 1 is for example displaced at a variable speed: it may be static during the successive depositions by the first group 15 and by the second group 16, then be displaced in order to present, to the first group 15 and second group 16, a region of flexible substrate 1 without a deposit made on it. In one variant, the flexible substrate 1 is transported at a constant speed. Preferentially, this speed is low in relation to the speed of displacement and/or of deposition, such that the impact region 17 substantially coincides with the same parts of the flexible substrate 1. In some variants, different speed profiles of the flexible substrate 1 may be implemented to correspond to a given deposit profile.

In one variant, the flexible substrate 1 is locally planar in the impact region 17 along a main plane, and at least three nozzles 9 are arranged in a plane that is parallel to, and different from, the main plane. Unlike the preceding embodiment, the different nozzles 9 may be static. A nozzle 9 enables, during a static spraying operation (static flexible substrate 1 and static nozzle 9), the production of a deposit of micro/nanoparticles 4, the surface density of which in the plane has a Gaussian profile. In some embodiments of the invention, the distribution of several nozzles 9 in a plane parallel to the main plane of the flexible substrate 1 enables a controlled surface to be covered with a controlled surface density of micro/nanoparticles 4 over the whole of this surface, and especially as a function of the arrangement of the nozzles 9 and of the spacing between the nozzles 9.

In one embodiment of the invention, the nozzles 9 are arranged according to a matrix comprising rows 11 and columns 12, the rows 11 being substantially transverse to the direction of transport 10 of the flexible substrate 1. The arrangement of the nozzles 9 in a matrix is suitable for covering a surface of flexible substrate 1 of micro/nanoparticles 4 homogeneously or substantially homogeneously. In one embodiment of the invention, at least one row 11 sprays suspensions 7 with the same composition of micro/nanoparticles 4 and with a composition that is different from at least one other row. Typically, the different rows 11 may be connected to different suspensions 7. This arrangement is suitable for continuously producing (for example at a constant speed of displacement of the flexible substrate 1) a material comprising multiple layers of micro/nanoparticles 4 and/or having different compositions of micro/nanoparticles 4. In one embodiment of the invention, the composition of micro/nanoparticles 4 of the suspensions 7 of the different rows 11 is periodical. This feature may enable the production of a deposit of homogeneous or pseudo-homogeneous layers by mixing the drops sprayed by the nozzles 9 close to the surface.

Figure 3:
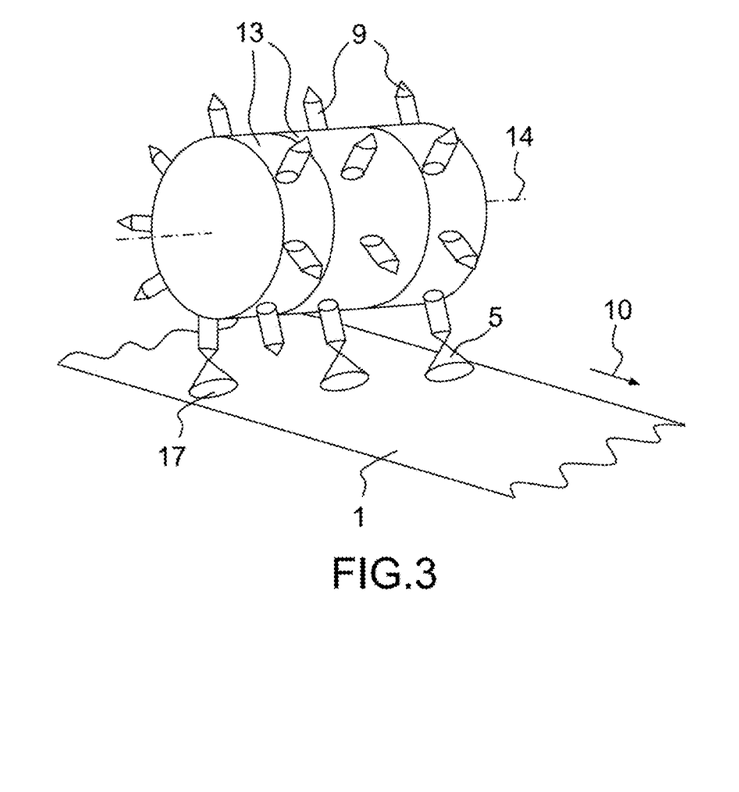
FIG. 3 is a schematic depiction of the arrangement of nozzles around carousels, for implementing a process according to the invention.

FIG. 3 is a schematic depiction of the arrangement of nozzles 9 around carousels 13, for implementing a process according to the invention. In this embodiment, the flexible substrate 1 may be locally planar along a main plane, and nozzles 9 are arranged around at least one carousel 13. For example, FIG. 3 illustrates a system comprising three carousels 13. In this embodiment of the invention, one axis of revolution 14 is common to all of the carousels 13. Carousel is intended to mean a solid structure, suitable for being connected to a guide along the axis of revolution 14 by a pivot connection and able to support different nozzles 9 connected to the carousel 13. The nozzles 9 may be securely fastened to a carousel 13 as illustrated in FIG. 3. In one variant, the connection between a nozzle 9 and the carousel 13 may be able to keep the orientation of a nozzle constant during the rotation of the carousel about the axis of revolution 14. In one embodiment of the invention, a carousel may be able to connect suspensions 7 of different micro/nanoparticles 4 and/or of different compositions of micro/nanoparticles 4 to the nozzles supported by a carousel 13.

Figure 4:
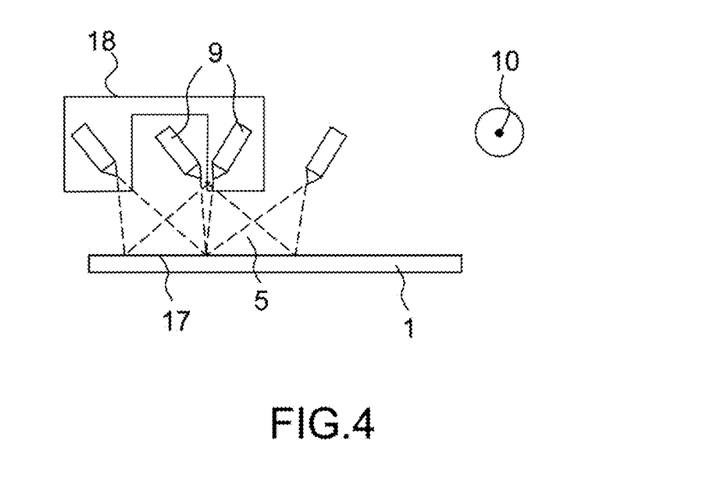
FIG. 4 is a schematic depiction of the spraying of a suspension 7 by two nozzles 9 over substantially the same impact region 17.

FIG. 4 is a schematic depiction of the spraying of a suspension 7 by two nozzles 9 over substantially the same impact region 17. In the process according to the invention, an assembly 18 of nozzles 9 comprises two nozzles 9 simultaneously spraying one or more suspensions 7 substantially over the same impact region 17 of the flexible substrate 1. In some variants, strictly more than two nozzles 9 may simultaneously spray substantially the same impact region 17. During the projection of a suspension by a nozzle 9, the droplets of suspensions are projected into a space defined by the deposition region 5. Projection axis is intended to mean the mean trajectory of the droplets projected into this deposition region 5. Two nozzles 9 may substantially spray a suspension over the same impact region 17 if the characteristic width of a nozzle 9 is very small in relation to the mean diameter of an impact region 17 and/or if the projection axis of the nozzles 9 is not collinear to the projection axis of the nozzle 9 spraying a suspension over substantially the same impact region 17. These conditions can be generalized for a number of nozzles strictly greater than two. The final method has the advantage of modifying the profile of the surface density of micro/nanoparticles 4 deposited in the impact region 17. Unlike a Gaussian distribution observed during spraying with a single nozzle 9 under static conditions, the distribution of micro/nanoparticles 4 during a spraying operation carried out with several nozzles 9 comprises several extrema. The adjustment of the position and the orientation of the nozzles 9 of the same assembly 18 enables these extrema to be positioned and the micro/nanoparticles 4 to be deposited pseudo-homogeneously over the impact region 17.

In one embodiment wherein suspensions 7 of the same composition are sprayed, it is possible to produce a coverage of the flexible substrate 1, the surface density of micro/nanoparticles 4 of which is substantially homogeneous. In one embodiment wherein the suspensions 7 comprise different compositions, it is possible to produce a coverage of the flexible substrate 1, the density of which is Gaussian in the case in which the characteristic width of a nozzle 9 is very small in relation to the mean diameter of an impact region 17. In the case in which the inclinations of the projection axes of the nozzles of an assembly 18 are different, it is possible to produce gradients of surface densities of micro/nanoparticles 4. The latter method may enable the optimization of the supercapacitors by producing series of supercapacitors with variable micro/nanoparticle compositions from the same flexible substrate comprising a gradient of densities of deposited micro/nanoparticles, then by choosing the one for which the performance is best suited to the chosen industrial application. In one embodiment of the invention, illustrated in FIG. 4, it is possible to arrange several assemblies 18 such that the different impact regions 17 are adjacent on the flexible substrate 1.

Figure 5:
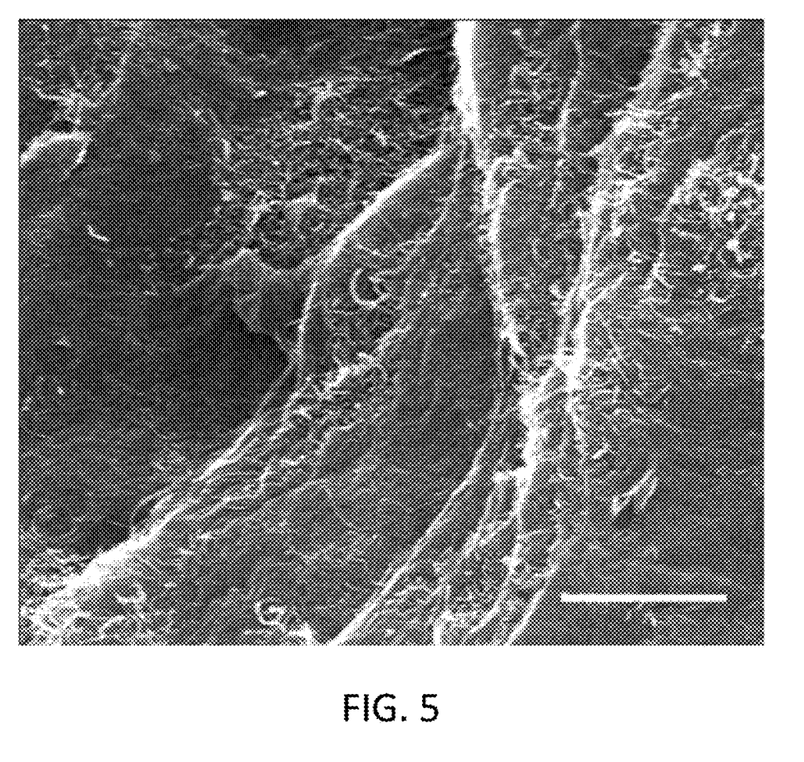
FIG. 5 is an image obtained with a scanning electron microscope of the structure of the material of a deposit produced with a suspension 7 comprising micro/nanoparticles 4 of graphene and carbon nanotubes.

FIG. 5 is an image obtained with a scanning electron microscope of the structure of the material of a deposit produced with a suspension 7 comprising micro/nanoparticles 4 of graphene and carbon nanotubes. FIG. 5 depicts the hierarchical structure obtained by implementing a process according to the invention: the oxidized carbon nanotubes are inserted between the oxidized graphene lamellae. The homogeneous distribution of the two structures may already potentially be initiated in the suspension before spraying, via possible esterifications between the hydroxyl and carboxyl groups of each of the two oxidized carbon-based structures. In a particular embodiment of the invention, other oxidized carbon-based structures can be introduced into the sprayed suspensions 9, such as carbon nanofibers, carbon nanorods, carbon nanohorns and carbon onions. The scale bar represents 100 nanometers.

Advantageously, a process according to the invention comprises a step wherein micro/nanoparticles 4 are oxidized before they are sprayed, or before they are suspended in the solvent 8, and a step wherein the deposit is annealed after spraying at a sufficient temperature to deoxidize the micro/nanoparticles 4. The deposit is for example annealed at a temperature of greater than 200° C. This temperature enables the micro/nanoparticles 4 deposited, such as graphene oxide and oxidized nanotubes, to be reduced or deoxidized, and the conductivity of the deposit of nano/microparticles 4 to be increased. This step is particularly advantageous at a deposition temperature that is too low to reduce or deoxidize the nano/microparticles 4, for example when using water as solvent for the micro/nanoparticles 4. This implementation of the process according to the invention has two separate advantages: firstly, the annealing operation enables the nano/microparticles 4 to be deoxidized at an effective temperature while keeping a lower temperature during the spraying operation (and the associated advantages such as the use of water as solvent 8). Secondly, the annealing may be carried out in a controlled manner, by setting for example an equal annealing time for all the particles deposited. The annealing may be carried out by one or more means similar to the heating means 19: by one or more resistive elements connected to an electrical supply circuit (not shown) so that the resistive element(s) emit heat by the Joule effect when an electric current passes through them. As a variant or in combination, the system comprises means for annealing by induction, for example comprising a plate close to the flexible substrate 1, comprising inducers that are able to induce electric currents in the plate and to generate heat.

The invention claimed is:

1. A process for producing a supercapacitor, comprising a flexible substrate, said process comprising at least the steps of:
   unrolling said flexible substrate from a first roll;
   spraying a plurality of suspensions comprising micro/nanoparticles suspended in a solvent, said suspensions being sprayed by a plurality of nozzles forming jets of droplets of said suspension defining a spatial region, referred to as deposition region;
   transporting at least a portion of said flexible substrate through a region for deposition of micro/nanoparticles, along a direction of transport of said flexible substrate, the interaction of said deposition region and of said flexible substrate forming an impact region;
   heating said flexible substrate, during each spraying operation, so as to encourage the complete evaporation of said solvent from said suspensions sprayed onto said flexible substrate;
   said process being wherein the composition of said micro/nanoparticles of one said sprayed suspension is different from the composition of said micro/nanoparticles of at least one other said sprayed suspension,
   wherein the assembly of said nozzles are arranged according to a matrix comprising rows and columns, said impact region of one said row being substantially transverse to the direction of transport of said flexible substrate,
   and in that an assembly of at least two nozzles simultaneously sprays at least two suspensions substantially over the same impact region.

2. The process as claimed in claim 1, comprising an additional step of winding said flexible substrate around a second roll.

3. The process as claimed in claim 1, comprising at least one step of exchanging the position of each of said nozzles from a first group of said nozzles with the position of each of said nozzles from a second group of said nozzles.

4. The process as claimed in claim 1, wherein said flexible substrate is locally planar in said impact region along a main plane, and wherein at least three of said nozzles are arranged in a plane that is parallel to, and different from, said main plane.

5. The process as claimed in claim 1, wherein at least one said row sprays said suspensions with the same composition of said micro/nanoparticles and with a composition that is different from at least one other said row.

6. The process as claimed in claim 1, wherein the composition of said micro/nanoparticles of said suspensions is periodical as a function of said rows.

7. The process as claimed in claim 1, wherein said flexible substrate is planar along a main plane and said nozzles are arranged around at least one carousel, one axis of revolution being common to each of said carousels, said axis of revolution being substantially parallel to said main plane and substantially normal to said direction of transport of said flexible substrate, said process comprising at least one step of pivoting at least one said carousel about said axis of revolution.

8. The process as claimed in claim 1, wherein two said nozzles of said assembly spray said suspensions of micro/nanoparticles with the same composition of micro/nanoparticles and of solvent at a different angle, substantially covering the same said impact region substantially homogeneously.

9. The process as claimed in claim 1, comprising an additional step wherein said flexible substrate is heated during each spraying operation, so as to encourage the complete evaporation of said solvent(s) from said suspensions sprayed onto said flexible substrate, to a temperature less than or equal to one and a half times the boiling point of each said solvent and less than or equal to 200 degrees Celsius.

10. The process as claimed in claim 1, wherein said micro/nanoparticles comprise graphene sheets.

11. The process as claimed in claim 1, wherein at least a portion of the micro/nanoparticles is oxidized before they are suspended in a said solvent.

12. The process as claimed in claim 1, wherein, before a spraying operation, said micro/nanoparticles are suspended in a said solvent composed of more than 95% water (H.sub.2O) by weight, and preferentially more than 99% water by weight.

13. The deposition process as claimed in claim 1, said micro/nanoparticles of which are selected from carbon nanotubes, carbon nanofibers, carbon nanorods, carbon nanohorns, carbon onions and a mixture of these micro/nanoparticles, wherein said micro/nanoparticles are oxidized before they are sprayed, and wherein said deposit is annealed after said spraying operation at a sufficient temperature to deoxidize said micro/nanoparticles.

14. The process as claimed in claim 1, wherein the thickness of said micro/nanoparticles deposited is measured during or after the deposition of said micro/nanoparticles.

15. An electrode comprising a said flexible substrate, said flexible substrate being covered with a deposit of micro/nanoparticles, said deposition of said micro/nanoparticles being able to be obtained by a process as claimed in claim 1.

16. A supercapacitor comprising at least one said electrode as claimed in claim 1.

* * * * *